United States Patent [19]
Forkner

[11] 3,846,562
[45] Nov. 5, 1974

[54] PROCESS FOR THE TREATMENT OF COCONUT

[75] Inventor: John H. Forkner, Fresno, Calif.

[73] Assignee: The Pillsbury Company, Minneapolis, Minn.

[22] Filed: Aug. 19, 1971

[21] Appl. No.: 173,106

Related U.S. Application Data

[63] Continuation-in-part of Ser. No. 74,310, Sept. 22, 1970, abandoned, which is a continuation-in-part of Ser. No. 866,452, Oct. 15, 1969, abandoned.

[52] U.S. Cl. ........................ 426/44, 426/49, 426/60
[51] Int. Cl. ............................................... A23l 1/36
[58] Field of Search ............. 99/125, 98; 195/8, 33, 195/37; 426/205, 207, 44, 60

[56] References Cited
UNITED STATES PATENTS
1,230,366   6/1917   Baker................................... 99/125
3,451,990   6/1969   Sole ..................................... 99/125

OTHER PUBLICATIONS

Ramamurti et al., "Enzymatic Digestion of Fibre in Cocoanut Cake." Nature 5-1963, pp. 481–482.

Primary Examiner—A. Louis Monacell
Assistant Examiner—J. M. Hunter
Attorney, Agent, or Firm—Flehr, Hohbach, Test, Albritton & Herbert

[57] ABSTRACT

A process for the treatment of cocoanut meat whereby the meat is modified and tenderized. The cocoanut is subjected to controlled fermentation with bakers yeast, subsequently deodorized and flavored. The tenderized cocoanut is produced in moist or dry forms with or without sugar and/or added cocoanut fat removed before the fermentation step.

10 Claims, 2 Drawing Figures

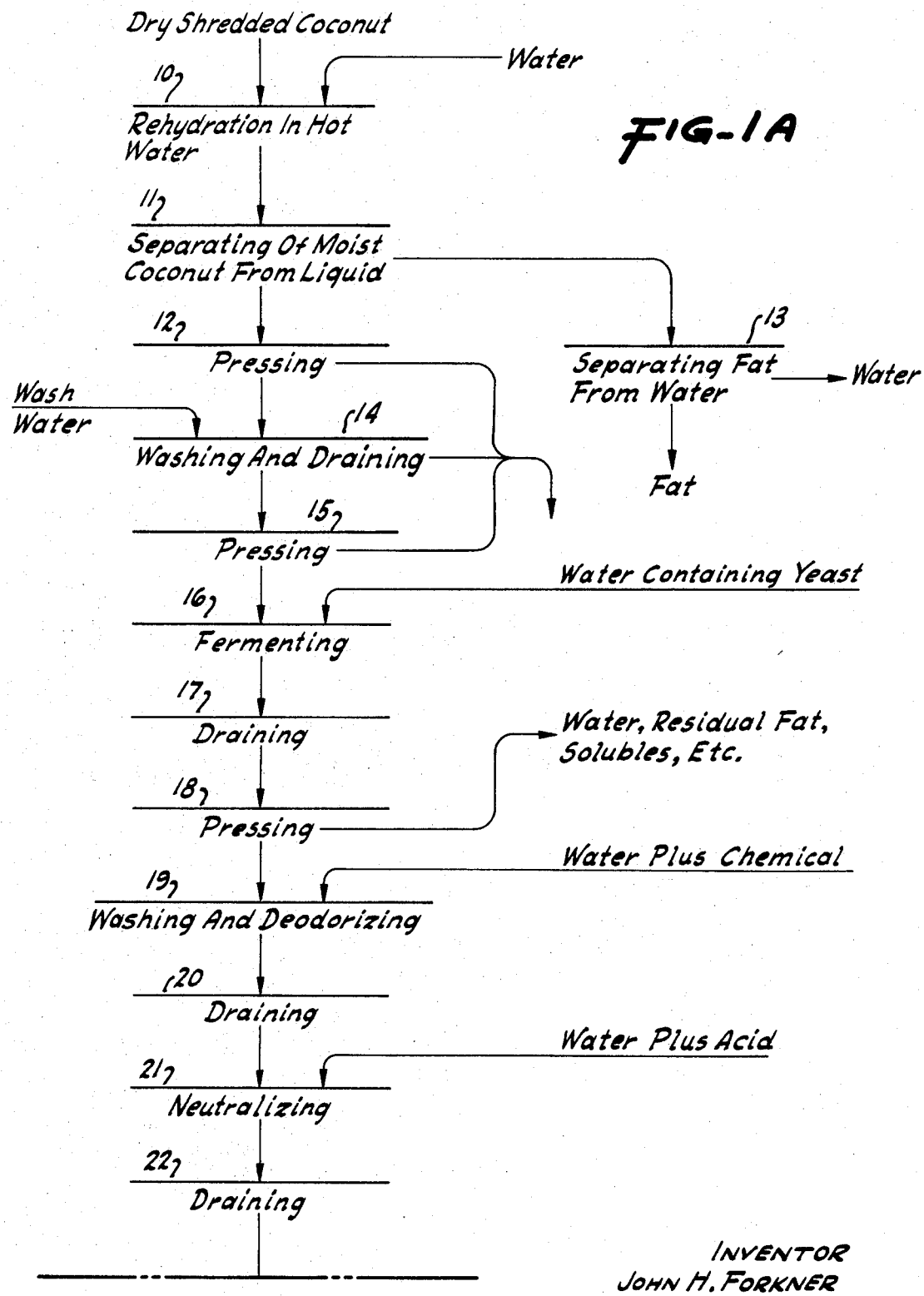

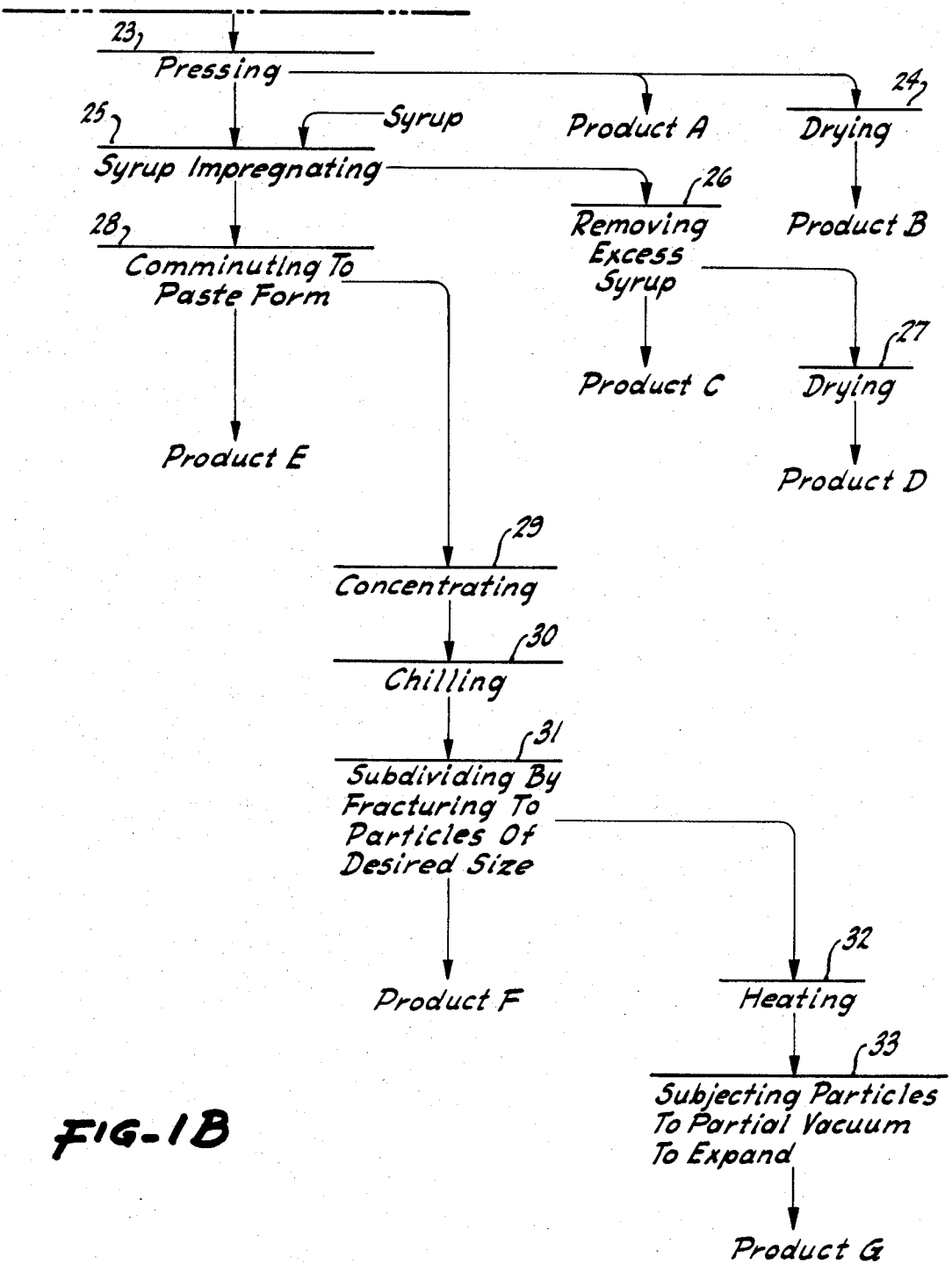

PROCESS FOR THE TREATMENT OF COCONUT

CROSS-REFERENCE TO RELATED APPLICATIONS

This application is a continuation-in-part of my copending application Ser. No. 74,310 filed Sept. 22, 1970 now abandoned, which is a continuation-in-part of earlier application Ser. No. 866,452 filed Oct. 15, 1969 now abandoned. Reference is also made to copending applications, Ser. No. 240,191, filed March 31, 1972 (now abandoned in favor of continuation application Ser. No. 452,740 filed March 20, 1974), and Ser. Nos. 335,834 filed February 26, 1973 and 335,688 filed February 26, 1973.

BACKGROUND OF THE INVENTION

This invention relates generally to processes for the treatment of coconut meat, and to new food products resulting therefrom.

Coconut meat as used in various foods has been subject to certain disadvantages. Particularly, it has a cellulose fiber structure such that it is tough when eaten, whether in the form of fresh meat, dried or desiccated, or impregnated with sugar or sugar syrup. Thus it resists cutting when incorporated in some cakes, cookies, confections and like products. The toughness appears to vary depending upon the location of the nut meat within the coconut shell. Thus the inner layer that contacts the milk may be relatively tender, the outer layer near the shell is quite tough, and the intermediate layer of intermediate toughness. Shredding and flaking have been applied to obtain more usable physical forms, but this does not modify its inherent tough character, although the thickness (minor dimension) may be of the order of 0.05 inches. Also the toughness remains after cooking by itself or in combination with other materials such as confectionary or bakery mixes. In general, these properties seriously limit application of commercial coconut products for confections or bakery uses. By way of example, conventional shredded coconut as incorporated in cakes is difficult to slice with a knife because of its inherent toughness.

One form of readily available coconut meat is the so-called desiccated coconut, such as edible copra. It is usually in the form of shreds or strings having a thickness (minor dimension) ranging from 0.05 to 0.15 inches, and a length varying from ⅛ to 4 inches. It is somewhat tougher than fresh coconut, presumably due to changes taking place during drying. Also, it tends to resist absorption of materials like sugar or sugar syrup. When subdivided to particulate form, it imparts a pronounced and unpleasant graininess to many foods in which it is incorporated. Generally, such desiccated coconut contains all of the original fat content, although some fat may have been removed by pressing before drying. Such coconut tends to dominate over other flavors with which it is associated. Also, it tends to be a dominant factor in determining the consistency of mixes in which it is incorporated.

Fermentation has been used in Asian countries to convert various natural foods, such as soybean, to cheeselike products. Also, enzymatic action has been used to facilitate removal of fat by breaking up the protein envelope enclosing fat globules. However, insofar as I am aware, such methods have not been adopted to produce coconut meat products having properties and uses comparable to the present invention.

SUMMARY OF THE INVENTION AND OBJECTS

In general it is an object of the invention to provide a process for the treatment of coconut meat which serves to convert it into new products characterized by relative tenderness and modified flavor characteristics.

Another object is to provide a process which modifies the fiber structure of coconut to reduce toughness and to increase its ability to absorb other materials (e.g., sugar syrup and flavors).

Another object is to provide a process of the above character which serves to convert coconut meat into a product that is impregnated with sugar and relatively tender compared to the source material.

Another object is to provide a process which increases the ability of coconut to absorb sugars and sugar syrups, thus making possible processed coconut containing greater amounts of sugar or sugar syrups, with extended shelf-life.

Another object is to provide a process which makes use of fermentation but which eliminates objectionable flavors and odors that may result from such treatment.

Another object is to provide a process that is capable of producing tenderized coconut products in relatively large sizes comparable to nut kernels or nut kernel pieces.

Another object is to provide a process in which the coconut source material (e.g., desiccated coconut) is treated before fermentation to remove a substantial amount of the fat content, whereby there is a reduced fat content during fermentation. Such removed fat may be reincorporated in the final product.

Another object is to provide a tenderizing process which can be controlled to obtain certain desired properties in the final products (e.g., different degrees of tenderness). For example, shredded coconut can be made which has good slicing characteristics, or with such modified characteristics that when eaten it feels tender in the mouth.

Another object is to provide novel coconut products which have wide usefulness in the food industry, including uses where present coconut products are not applicable.

Another object is to provide novel coconut products which when in hydrated or moist form can be readily severed or cut with a knife, thus making a material which is well adapted for use in cakes, cookies, confections and the like.

Another object of the invention is to provide coconut products in dry form which are readily rehydrated when contacted with water or water containing mixes.

Another object is to provide novel coconut products resulting from the process, including a tenderized product in moist or dry form, tenderized coconut impregnated with sugar or sugar syrup, tenderized sugar impregnated coconut in dry form, products in paste or jam form, particulate confection-like products that may contain milk solids and fat (e.g., caramel and fudge), products containing materials such as cheese, tomato, fowl, meat or fish, and products that are expanded.

Another object is to provide novel food products containing my coconut material, including confections, cookies, cooky dough in chub form, cakes, pastes, jams, jellies and the like.

In general, the present process includes some pretreatment of the coconut, followed by fermentation in an aqueous medium containing a fermenting agent. The fermenting step serves to weaken the fiber of the coconut, thus making the material more susceptible to absorption of liquid substances, and imparting tenderness. The tenderized coconut may then be treated to eliminate odors and flavor resulting from fermentation. The resulting tenderized coconut meat may be used in moist form or may be dried by conventional methods, such as air drying or drying under vacuum. In certain embodiments the tenderized coconut is impregnated with sugar (e.g., sugar syrup) to form a tenderized and sugar impregnated product. The coconut produced by the process is characterized by a tenderness which contrasts with the relatively tough character of the original coconut meat, and also by a somewhat modified flavor.

Final products resulting from impregnation with sugar include tenderized coconut particles (e.g., shreds) impregnated with sugar syrup, dehydrated particles impregnated with sugar or sugar syrup, sugar containing coconut paste, particulate confection-like products, products containing substantial amounts of food ingredients like cheese or tomato, and products that are expanded. Also the tenderized coconut meat may be included in and thereby characterize various food products (e.g., confections, snacks or cookies, cooky doughs, jams or jellies). Coloring and flavoring can be added to obtain various colored and flavored products.

BRIEF DESCRIPTION OF THE DRAWING

FIGS. 1A and 1B taken together form a flow diagram illustrating steps of the process and various resulting products.

DESCRIPTION OF THE PREFERRED EMBODIMENTS

In general, the present invention involves preliminary treatment of the coconut meat in which some fat is removed, followed by a fermenting operation which serves to modify the fiber of the coconut. Following fermentation, the coconut may be treated for removal of undesired odors and flavor. The resulting material is then further processed to produce one or more end products.

The drawing illustrates a suitable procedure for producing various products from coconut. The source material employed preferably is desiccated shredded or string coconut which may be pieces of meat ranging in thickness from about 0.05 to 0.15 inches and ranging in length from 0.8 to 4 inches. Such dried coconut is readily available and generally retains its original fat content.

A typical analysis is as follows:
| | |
|---|---|
| Moisture | 3.5% |
| Fat | 64.9% |
| Protein | 7.2% |

In step 10 the pretreatment serves to rehydrate the source material and to release a substantial amount of the fat content. The procedure indicated involves immersion in hot water above the melting point of the fat (e.g., 100° to 212°F.). In practice good results are obtained by introducing the coconut into boiling water. It is desirable to release a major part of the fat content during pretreatment (e.g., 22 lbs. of fat per 100 lbs. of original shredded coconut). According to my observations, pretreatment in hot water causes some disruption of the cells of the meat, thus exposing protein and other soluble constituents contained within the cells for subsequent treatment and partial removal.

In practice, step 10 can be carried out by immersing the coconut in boiling water (212°F.) over a period of the order of from 5 to 60 minutes, the longer period being used for the larger particles. Instead of boiling at atmospheric pressure, this step can be carried out in a pressure vessel to obtain higher treatment temperatures (e.g., 215° to 230°F.), thus shortening the time required and effecting some preliminary tenderizing.

It is desirable during pretreatment to remove a substantial amount of the fat content of the source material, because if such fat becomes exposed in a free state to fermenting liquid it tends to cause production of undesirable by-products (e.g., fatty acids) which impart undesirable flavor. However, noticeable off flavor does not result from a residual fat content, comprising as much as two-thirds of the original fat content retained within the coconut structure. This is believed due to a natural protective characteristic of the coconut which enables the fat to survive intact fermentation and exposure. Such fat appears to be desirable since it may tend to preserve and sustain palatability of the end products.

Following step 10, free water, solubles and fat are removed as by draining in step 11, and the material subjected to pressing in step 12 to remove additional liquid. The liquid removed in steps 11 and 12 consists of hot water together with a substantial part of the fat content and solubles extracted from the coconut. This liquid is shown being subjected to separating step 13, which can be carried out by suitable centrifuging apparatus to produce separate fat and water fractions, the solubles being contained in the latter. The fat removed at this point can be stored and re-used in the process, as will be presently described. This minimizes the presence of fat during subsequent fermentation.

Pressing in step 12 can be carried out by use of a conventional filter press. The resulting moist coconut after pressing can be mechanically separated and then resaturated with fresh water in step 14, followed by draining off excess liquid. Further pressing can be applied in step 15 to produce a moist material suitable for the fermenting step 16. Here again the pressed material is mechanically separated and fresh water added.

It should be understood that various known procedures can be used for carrying out the draining, pressing and washing operations referred to above. As will be presently explained, it is desirable to make use of filter presses to expel as much liquid as possible from the material undergoing treatment. However, it is possible to use conventional filters of the screw, belt or drum types, with application of fresh rinse water for resaturating the materials while on the filter membrane, or following dewatering steps. Also it is possible to use centrifuges of the basket type.

In step 16 the moist coconut from step 15 is mixed with fresh water preparatory to fermentation. At this time it is hydrated to the point of being saturated with water. Fermentation makes use of an active fermenting agent or organism and serves to tenderize the material.

One fermentation agent which has been used with good results is ordinary bakers yeast such as is sold in moist and dry forms. It can be mixed with a small amount of water to form a slurry, which is then introduced into the water supplied to step 16. Also the preliminary mixture of bakers yeast and water may be supplemented with yeast nutrients and held for promoting some preliminary fermentation to form a yeast brew, which is then introduced into step 16. Nutrients supplied to facilitate development of the yeast brew may include sugar, mineral salts, phosphates and nitrogenous matter.

As is well known yeast contains a number of enzymes and yeast fermentation is an enzymatic activity. According to my observations, when bakers yeast is used as a fermenting agent, the resulting fermentation occurs in such a manner that the fiber structure of the coconut is partially digested to tenderize the product. Also the protein of the coconut undergoes some change, as will be presently explained.

Tests have shown that coconut (including fresh coconut or coconut that has desiccated and rehydrated) has naturally contained fermenting organisms which may contribute to the organisms of yeast in tenderizing the meat. It is possible to make use of such natural organisms alone under substantially the same temperature conditions as bakers yeast, although the fermentation time required for a given tenderizing effect is longer (e.g., 72 hours as compared to 36 hours with bakers yeast). Fermentation by natural organisms can be promoted by addition of a carbohydrate, such as sucrose.

Assuming use of dry bakers yeast, the amount used may be about 3 percent by weight of the weight of source coconut (i.e., desiccated coconut) in the batch.

The fermenting step 16 is preferably carried out under controlled conditions of time and temperature. The temperature can be maintained at a level within the range of about 70° – 120°F., about 88° to 98°F. being deemed optimum. The time period of fermentation should be sufficient to effect a substantial amount of tenderizing, and should be terminated when experience has shown that the amount of tenderizing produced will provide the desired products. In addition, the time period should not be sufficient to cause development of objectionable flavors, odors or by-products that cannot be removed in subsequent processing. In general, I have found that with bakers yeast and with a temperature level of from about 88° to 98°F., fermentation can be continued to obtain the desired results for a period of the order of from 1 to 6 days, depending upon the character of the coconut particles and the results desired.

The size of the coconut particles is a factor which should be taken into account in selecting the fermentation time. For example, pieces ⅜-inch thick (i.e., minor dimension) and 2 inches long, may require 5 or 6 days fermentation, while particles (e.g., shreds) having a minor dimension of the order of 0.05 inch or less require only 2 or 3 days. In practice, the fermentation time is controlled to produce the desired amount of tenderizing of the coconut undergoing treatment.

After the desired modification of the coconut in fermentation step 16, the fermenting operation is arrested in step 17 as by draining off the liquid fraction and then subjecting the material to pressing 18 and washing 19 with fresh water. This removes most of the yeast and solubles developed and released during fermentation. Here again, instead of using conventional draining, pressing and washing, the removal of fresh liquid and washing can be carried out on a filter membrane or such as a filter of the belt, drum or screw type, or by use of a basket type centrifuge. However, as with the steps of pressing and washing preceding fermentation, I prefer (particularly when desiccated, shredded or string coconut is the source material) to employ one or more filter presses (e.g., presses of the feedscrew type) with provision for washing with fresh water after pressing. With such equipment, a batch of material may be pressed to extract water two or three times on the same or different presses with intervening fresh water resaturation. As previously indicated, washing of the pressed material is facilitated by mechanically breaking apart the compressed mass to enable the wash water to penetrate and contact the individual particles. Such pressing and washing operations may be by batch or continuous. Use of multiple presses is particularly applicable to coconut meat in the smaller sizes (e.g., coconut shreds or strings) where some subdivision during pressing is not objectionable. Assuming use of desiccated coconut shreds as the source material, the fermented material after step 16 has sufficient strength and resiliency to prevent disintegration during subsequent pressing and washing, thus facilitating these operations without unnecessary loss of desired product fractions in the separated water.

The liquid removed in steps 17 and 18 after fermentation also includes some residual fat not removed in step 11. Such fat may be separated from the liquid but is of low quality and is not incorporated in the products produced, unless it is refined.

Immediately following removal of excess water from the fermented coconut in step 17, it is desirable to treat the material to eliminate or minimize undesirable odors and flavor. I have found that a dilute solution of soda (i.e., 1 percent solution of sodium carbonate or sodium bicarbonate) is effective for this purpose. Such chemical can be added to the wash water in step 19, where the pressed material is mechanically separated and contacted or immersed in the water. According to my observations, such treatment serves to solubilize and remove certain components of the material that contribute to objectionable odors and flavor, such as degraded protein and free fatty acids. Also it may directly react with certain of such components, resulting in dissolved reaction by-products which are relatively free of yeast-like odors and objectionable flavor. After being in contact with the chemical solution for a short time (e.g., 2 to 5 minutes for coconut shreds or as long as an hour or so for larger pieces), excess solution is removed as by draining in step 20, after which the material is contacted with a dilute neutralizing acid (e.g., 0.25 percent hydrochloric acid solution) in step 21. Neutralization is readily effected by immersing the material in the dilute acid solution for a short time (e.g., 2 to 5 minutes for coconut shreds or as long as an hour or more for larger pieces), after which the excess liquid is removed in step 22.

The deodorizing chemical used may be any simple alkali which will not injure the coconut, and which will not cause any serious contamination of the end products. In addition to sodium carbonate and sodium bicarbonate, it is possible to use other alkali chemicals such as sodium or potassium hydroxide, sodium phosphates, and calcium hydroxide. The acid employed should be one which rapidly reacts to neutralize the alkali and which again will not cause any injury to the coconut or detrimentally affect the end products. Hydrochloric acid is preferred, although other common acids can be used, such as citric, tartaric and malic.

The moist material from the processing step 23 has been indicated as product A. This is a moist modified tenderized coconut meat which can be introduced into materials like cake doughs or batters, without further modification. It can be milled to form a smooth product of cheese-like texture. Also it may be subjected to conventional drying step 24 to produce the dry product B. The moisture after drying should be of the order of 2 to 4.5 percent to have good keeping properties. The dry material readily rehydrates upon contact with water.

In step 25 the moist coconut is shown being subjected to an impregnating step in which it is impregnated with sugar syrup. The syrup employed can be one such as is commonly used in the manufacture of glace fruit. Thus it may be an invert sugar syrup such as is used in the confectionary industry, or a mixture of invert syrup, corn syrup, and sucrose. Also it is possible to use a simple sucrose or corn syrup. Sorbitol may be employed with or without added sugars or sugar syrups. When the impregnated syrup contains substantial amounts of such materials as corn sugar or corn syrup, or malt sugar or malt syrup, it is suitable for use in products that are expanded by subjecting them to a vacuum at an elevated temperature.

Impregnation of shredded coconut or string coconut can be carried out at an elevated temperature at or near the boiling point of the syrup (e.g., 220° to 265°F.); optimum range 225° – 250°F.). For example, the syrup added in step 25 can be about 50 Brix, and during impregnation the syrup is gradually concentrated by evaporation whereby at the completion of the impregnating step the syrup can be at about 70 to 80 Brix. When the sugar impregnated product is to be dried, the impregnating step may be carried out at the higher temperatures and for a short time, whereby penetration is limited to a desired density and a glisten is imparted to the surface.

In some instances it may be desirable to carry out impregnation at lower temperature levels under partial vacuum, as when it is desired to retain the natural white coconut color.

Impregnation can be carried out in a suitable vessel equipped with heating and agitating means whereby the mass of syrup and coconut particles can be heated to boiling temperature over the period of impregnation. In a typical instance where the syrup is initially at about 50 Brix and is at substantially 80 Brix at the end of the impregnating operation, the temperature may range from about 215°F. at the beginning of impregnation to about 230° to 265°F. at the end of impregnation, and the time period of treatment may range from about ½ to 2 hours. In general, for a product comparable to candied fruit, impregnation should be continued until the sugar syrup has effectively penetrated into the interior of the coconut meat and until the moisture content of the coconut meat becomes equalized with the moisture content of the syrup.

Impregnation as described above is accompanied by removal of a substantial amount of moisture from the coconut, as for example, from 25 to 50 percent of the moisture of the coconut material as supplied to step 25. In some instances, as much as 95 percent of the moisture can be removed from the coconut, as for example, when boiling of the syrup is continued to obtain concentrations of the order of 90 to 95 Brix to provide a brittle product that may be fractured to particulate form.

Product A or B, with or without milling, may be incorporated in a conventional spread (e.g., jam, jelly or marmalade) as a thickener. When such a mix is subjected to baking (e.g., as a filler in dough) some further penetration of sugar syrup into the coconut takes place.

As previously stated, it is desirable to remove undesirable yeast odors and flavor by chemical treatment before impregnation. However, it has been observed that some residual odors and flavor resulting from fermentation can be removed by the use of the higher impregnating temperatures. If chemical treatment before impregnation is omitted, the higher impregnating temperatures serve to drive off yeast flavors and odors to a substantial degree. With use of chemical treatment before impregnation, the higher impregnating temperature can be used to remove any undesirable residual odors and flavor. Chemical treatment before impregnation makes possible acceptable products that are not impregnated, or products where higher impregnating temperatures are not employed or not applicable (e.g., when impregnation is carried out under vacuum).

Assuming that it is desired to carry out surface impregnation of fresh coconut dices to be later dried, in such a manner as to effect maximum removal of undesirable odors and flavor, the syrup can be concentrated to a density of about 80 Brix or higher (85 optimum) before introduction of the moist fermented coconut. The coconut dices at the time of introduction may, in a typical instance, consist of about one-third water and two-thirds coconut meat (by weight). About 1 part (by weight) of the moist coconut can be added to about 2 to 4 parts of syrup. Boiling of the syrup ceases due to the drop in temperature, and the syrup density likewise falls, in a typical instance, may be reduced to about 70 Brix. With effective continuous heating, boiling can be re-established within a short period of about 2 to 5 minutes. After boiling over a period of the order of 2 to 50 minutes, any undesired residual flavor and odors resulting from fermentation are reduced to a relatively low level. Where the product is to be subjected to subsequent drying, boiling may terminate soon after the 2 to 5 period (e.g., total boiling period of 5 to 15 minutes), after which excess syrup is removed and the impregnated coconut dried. For products that are not to be subjected to drying, boiling of the syrup may be continued for periods of the order of 20 to 60 minutes or more to complete impregnation and to ensure elimination of residual flavor and odors. As a practical procedure, boiling of the syrup can be continued until it has reached concentrations of 80 Brix or higher. This has been found to effectively impregnate the coconut particles with removal of any undesirable residual flavor and odor present before impregnation. In instances where it is desired to reuse the syrup which has been drained from the impregnated coconut, it is desirable to subject it to preliminary boiling before introducing a successive batch of fermented coconut. This serves to reduce any flavor and odors remaining as the result of fermentation.

In general, the time period for impregnation is dependent upon such factors as the size of the particles and the desired degree of impregnation. Although in the foregoing, as applied to coconut dices to be dried, the syrup is heated to boiling temperature after being momentarily cooled by introduction of the moist fermented coconut, it will be evident that in a continuous operation the syrup may be maintained at boiling temperature as the moist fermented coconut is being added and progressively removed. Somewhat higher syrup temperatures can be employed to aid in effective removal of any undesirable residual flavor and odors, by maintaining the syrup under pressures somewhat greater than atmospheric.

After impregnation, any excess free syrup can be removed in step 26 to form the product C, which consists of the impregnated and tenderized coconut together with some sugar syrup. The sugar or syrup may be viscous or may have been sufficiently concentrated to be solid at ambient temperature.

Again referring to processing pieces of fresh coconut of substantial size (e.g., dices), after removal of excess syrup in step 26, the pieces may be rinsed in fresh water (preferably boiling) and dried in step 27 to produce the dried product D. When desiccated coconut (e.g., shreds or strings) in the source material, it may not be necessary to drain off any syrup in step 26, depending upon the amount of syrup used during impregnation.

For many purposes it is desirable to provide a paste or paste-like final product. Thus, assuming that desiccated coconut shreds or strings is the source material, the impregnated materials from step 25, with or without removal of some free syrup, may be comminuted in step 28 to product product E in the form of a paste. The product E can be used as a base ingredient in the making of such products as jams, jellies, confections, macaroons and the like. Depending upon processing details, the coconut content of the material after step 25 may be sufficiently disintegrated to form a paste, as for example when the source material is desiccated coconut shreds and fermentation is carried out to such an extent that disintegration occurs during impregnation. For a smoother paste the coconut can be milled after step 23 and introduced as a milled material in step 25.

As previously mentioned, the fat removed in step 13 is of good quality and is suitable for reincorporation in final products. As indicated, some of such fat, with or without other fats or supplements, can be introduced into step 28 and reincorporated in the coconut paste. If removed fat is not reused in this manner, a substituted fat may be used in step 28.

Additional products F and G are shown being made from the sugar impregnated coconut. To make product F, the impregnated material from step 28 (or step 25 if sufficiently comminuted) is further concentrated in step 29 (e.g., to 90 to 95 Brix) whereby when cooled to ambient temperature or somewhat lower in step 30, it becomes brittle. In step 31 the brittle material is subdivided into hard fragments of the desired size to form the discrete material F.

To form product G, the particulate product F is reheated (e.g., to 180°–212°F.) in step 32 and subjected to a partial vacuum in step 33 whereby it is expanded with substantial increase in volume.

Assuming that some syrup is removed before comminuting the material in step 28, the removed syrup may be replaced with some other syrups or confections that are partially absorbed by the coconut particles. In this way I can produce a product of jam-like character suitable as a filling in bakery products of the fig bar or filled cooky type. If more coconut flavor is desired, the cooky or cake batter or dough may be filled with both the present product and conventional desiccated coconut, the syrup contento supported by the present product being relied upon to provide a desired sugar level in the mix.

Various flavoring components or extracts can be added to any of the products referred to above. With respect to products A and B, such flavoring can be added to the moist material immediately after pressing 23. With respect to products C, D, E, F and G, flavoring can be added in the impregnating step 25, or to the material immediately after step 26. Various edible colors can also be added where it is desired to provide colored coconut meat. Thus a desired color can be added immediately after pressing 23 to produce products A and B. Also coloring can be added to the impregnating syrup or to the material immediately after step 26 to produce colored products C and D. Coloring can be added in step 28 to produce a colored paste product E, F and G.

The drying operations 24 and 27 referred to above can be carried out by any of several methods, including sun drying, use of tunnel or tray dryers in which the product is contacted with hot drying gas, vacuum drying in which the product is dried at a partial vacuum, and freeze drying in which the frozen material is dried under vacuum.

Assuming that no added coloring is used, the color of the processed coconut is white or a light golden color. If a darker tan or brown shade is desired, the higher drying temperatures can be used with time and temperature factors controlled to provide the desired shade.

The various products produced as described above have a characteristic residual mild coconut flavor. However, the natural coconut flavor is moderated by the treatments described. Thus a sweet flavor is imparted by sugar syrup, a toasted flavor may be imparted by browning at high temperature, or a caramel flavor by heat treatment to carmelize the syrup and darken the coconut. Also the flavor can be modified by various flavoring additives as previously described. There is a complete absence of the toughness characteristic of conventional coconut particles, and in contrast, the meat particles are relatively tender, or the tenderized meat is disintegrated and dispersed in the syrup. Assuming that the product is colored in the manner described, the coloring penetrates the interiors of the particles and they are relatively uniform and stable compared to colored coconut flakes or shreds such as have been produced in the past. This is attributed to the fact that by fermentation the structure is modified whereby color quickly penetrates into the interior of shredded particles, whereas normal coconut meat tends to resist color penetration. Tenderized coconut dices produced by my process likewise can be colored in the same manner, although a longer time is required for complete penetration.

Although the method is particularly applicable to desiccated coconut as the source material, it is possible to use fresh coconut meat. The fresh meat can be subdivided into particles of desired size and shape (e.g., shreds) and then immersed in hot water in step 10 the same as desiccated coconut. Treatment in step 10 may again serve to release and remove a substantial amount of the fat content.

When the fresh coconut meat is the source material, it is generally desirable to avoid disintegration of the material during processing. Thus fermentation can be terminated before any substantial disintegration occurs. Also the use of filter presses may cause some disintegration of the material, in which event gentler methods of treatment can be employed, such as the use of filters of the belt or drum type. In some instances it may be desirable to extend fermentation whereby substantial disintegration occurs and the meat is tenderized to the extent that it disintegrates during subsequent handling. Such material may be treated by washing and expressing of liquid in a high pressure filter press to produce a filter cake which can be used as a moist product or dried, with or without being comminuted.

Instead of shredding fresh coconut, it may be subdivided into chunks the size of nut kernels or kernel pieces. The fermentation operation should be controlled as to time to tenderize such pieces to the extent desired. The tenderizing action during fermentation progresses inwardly from the outer surface of the pieces whereby fermentation can be terminated to provide pieces which have cores which are harder than the outer layers. Such pieces can subsequently be partially impregnated with sugar syrup and further processed to produce dry pieces like product C which are nut-like in character. The use of filter presses should be avoided if it is desired to retain the physical identity of the original pieces.

In general, the products produced by my invention can be used for a variety of purposes. For example, the moist product A comprises tender coconut particles which can be incorporated in a variety of bakery products. When so used, they are not materially modified during baking, and in the baked products in which they are incorporated they can be readily severed when the bakery product is sliced. They also have an excellent natural flavor although they are compatible with added natural or artificial flavors. The latter can be added for flavor enhancement or to an extend sufficient to mask over the natural flavor of the particles.

The dry product B can likewise be used in the same manner as product A. When incorporated in moist doughs or other mixes, the particles readily absorb water to attain a moisture content consistent with the surrounding mix.

Product E is representative of products impregnated with sugar and in the form of a homogeneous jam or paste. Such pastes may be relatively viscous or comparatively fluid. Some larger coconut particles which are nut-like in consistency may be included. A characteristic of such viscous pastes and jams (product E) is that when used as a filling for bakery products, they do not tend to liquify during baking and therefore do not spread in the baking process. Also such a filling does not tend to burn in the oven or stick to contacting metal surfaces, even though surfaces of the filling may be directly exposed to the oven heat during baking or in direct contact with hot surfaces of the baking pan. When such a paste or jam is incorporated with or in contact with unbaked dough, moisture does not tend to migrate from the jam to the dough, thus permitting storage for long periods under refrigeration or in frozen condition. Compared to conventional coconut, such jams will support a greater amount of syrup, thus making possible bakery products which have increased syrup content compared to bakery products made from normal coconut meat. Such increased syrup content tends to increase the shelf-life of bakery products in which it is incorporated. When used in confections it serves as a stabilizer and imparts chewiness, a smooth mouth feel or nut-like eating properties. Also it makes possible a higher syrup content in the confection without moisture migration outwardly. In certain confections, like those that are expanded by vacuum, the coconut when present acts as an absorbent to reduce tendency of sugar to liquify due to hygroscopicity and to sustain piece retention in moist food products. The coconut paste product can be used with other ingredients to make a macaroon dough or mix, such as is employed for the manufacture of macaroon cookies, or as fillings, or particles in conjunction with dough or other food products.

Dry product D when made from the larger coconut particles may be consumed as such as previously indicated, or may be incorporated in moist dough or moist mixes whereby they are caused to partially rehydrate by moisture absorption. Dough containing such particles can be subjected to normal baking without deterioration. When exposed on dough surfaces during baking, they are not subject to burning or sticking to the pan. They can be readily severed by a knife or conventional cutting devices after being incorporated in uncooked dough and after the dough has been cooked by baking. For example, in instances where natural nuts tend to pull out or to be dislodged from the baked dough, substitution of my particles will produce a cake which can be sliced without such dislodgement or pulling out of the particles.

In addition to introducing my products into doughs and mixes, in the manufacture of cakes, cookies and confections, it is possible, for example, to use the products to form a core for a cooky chub. By "chub" I have reference to a relatively firm dough suitable for making cookies, which is sold as a refreegerated grocery product in the form of a dough mass which may be about 2 inches in diameter and several inches in length. When used by the consumer, the chub is cut into slices which are then baked on a pan. A novel consumer chub can be made by incorporating a viscous paste or jam, corresponding to product E, as a central core in the chub. Thus each of the slices contains the paste as a filler, and the filler remains intact during baking. additional flavoring ingredients can be introduced into the coconut paste, as for example, ingredients which make the paste correspond to a macaroon mix. Such a filling (e.g., located centrally and confined by baked dough) can be expanded under vacuum while the cooky is at an elevated temperature.

As previously indicated, fat recovered in step 13 and preferably washed to remove protein and other solubles, can be returned to the process and incorporated in some of the final products. For example, such fat can be introduced into step 28 and homogenously intermixed with the resulting paste. Also such fat can be used as a coating material on a dry product, such as product D, with or without other coating materials. The recovered fat is not deteriorated by fermentation. Its reintroduction can be controlled in accordance with the effects desired in the final product.

The following are examples of my invention:

EXAMPLE 1

The source material employed was 100 lbs. or dry commercial desiccated coconut, in shredded form, having a moisture content of 2½ percent. This was added to 350 lbs. of boiling water and held at boiling temperature for 15 minutes (step 10). This batch was then deposited (e.g., in four successive portions), into a basket centrifuge, having side walls formed by a 1/16th inch screen. The basket was rotated at 1,200 r.p.m. for 3 minutes, after which the resulting presscake of hydrated coconut meat was removed from the basket (step 11). The presscake at that point weight about 126 lbs. and contained some residual fat. The liquid drained from the material in the centrifuge was separately centrifuged to recovering 22 lbs. of fat. This fat was washed in clear warm water and recentrifuged to remove residual solubles (e.g., dissolved protein) removed from the coconut meat in step 10. To the remaining 126 lbs. of moist coconut meat in step 10, 200 lbs. of water containing 3 lbs. of fresh bakers yeast was added and dispersed therein, together with 3 lbs. of granulated sugar (sucrose) as starting yeast food. The temperature of the water was such that the resulting temperature of the batch was 98°F. The batch was then placed in a proof room and held at 98°F. for a period of 48 hours for fermentation (step 16). Then the batch in four equal parts, was then replaced in the centrifuge described above and recentrifuged with removal of most of the yeast liquor. After centrifuging, the four parts were combined again and resaturated with 200 lbs. of warm water (140°F.) containing 2 lbs. of sodium bicarbonate (step 19). After a holding period of 5 minutes, the mass was again divided into four parts (step 20) and recentrifuged to effect removal of most of the soda solution. This yielded 90 lbs. of 70 percent solids moist coconut presscake. It was observed that the moist press cake has a very mild residual yeast odor and flavor in contrast with the pronounced yeast odor and flavor of the fermented presscake before deodorizing.

EXAMPLE 2

The procedure was the same as in Example 1. However, after recovery of the presscake from the centrifuge which removed most of the 1 percent soda solution, the moist coconut presscake was resaturated again, this time with 200 lbs. of warm (140°F.) water containing 0.25 percent hydrochloric acid and held for about 5 minutes. This served to neutralize residual sodium carbonate. Thereafter, the batch was again centrifuged in four separate parts as described in Example 1. This time, however, after centrifuging, the presscake was separated from the basket walls and broken up and resaturated with fresh water. About 50 lbs. of fresh water was used each time making a total of 200 lbs. for each of the four separate loads in the centrifuge. The centrifuge in each instance after water resaturation was operated to remove the free liquid. This treatment effectively neutralized sodium carbonate and left only traces of sodium chloride as a reaction byproduct in the coconut material. The final weight of the moist material (30 percent moisture and 70 percent solids) was 87 lbs., compared to the 100 lbs. of the original desiccated shredded coconut. In addition, and later reincorporated in products as described in subsequent example, 22 lbs. of fat was removed as described in Example 1. Fat in the water removed after the yeast action was only recovered as waste fat and was not reused in the process. This waste fat weighed 6 lbs. 2 oz. The moist coconut presscake was very bland in flavor and odor. It was quite absorptive with respect to syrup, added flavor, color and odors. Its color was "coconut white", thus being conductive to sustaining bright natural and added artificial color.

EXAMPLE 3

The procedure was the same as in Example 2. The final 87 lbs. of recovered moist coconut presscake was placed with other ingredients in a steam heated kettle made of stainless steel and provided with agitating means. The ingredients and proportions were as follows:

|  | lbs. |
| --- | --- |
| Coconut presscake | 87 |
| Corn Syrup (42 D.E.) 80 Brix | 108 |
| Invert sugar syrup 80 Brix | 108 |
| Granulated sugar (sucrose) | 54 |
| Salt (NaCl.) | 1½ |

Boiling of the mass was continued until the syrup reached a density of 80 Brix, at which time heating was discontinued, and 12 lbs. of the coconut fat recovered as in step 13 described in Example 1, was added to the hot syrup with continual agitation to mix it thoroughly in the mass. On removal from the kettle the weight of the batch was 306 lbs. It was observed that the coconut meat had largely disintegrated in the concentrated syrup, thus forming a smooth jam. Some small, tender coconut particles still remained and were observed to be individually permeated with syrup, in effect candied, in that they were receptive to absorption of syrup in the impregnating step. Only a very slight amount of residual yeast flavor was noted and this was not objectionable. It was found that the residual yeast flavor could be readily masked by addition of flavoring constituents. The mass was cooled before packaging in fiberboard cases lined with wax paper. The color was a greenish yellow comparable to applesauce.

The paste product produced in the foregoing Example 3 was found to be useful for various purposes, including the following:

1. As a filling in bakery products, with or without added flavoring. For example, in one instance a filling was prepared by mixing 10 lbs. of the product with 3 oz. of cinnamon. In another instance to 10 lbs. of the product there was added 1 oz. of orange oil, 5 cc of yellow (F.D.A. approved) color and 2 cc of red (F.D.A. approved) color to make an orange jam. This jam was used as a filling in bakery products and it was observed that such jam did not liquify or run during baking, and during baking exposed surfaces of the jam mass did not burn, and contact with pan surfaces did not cause burning or sticking. Another jam was prepared by mixing the paste product with raspberry jam in equal parts. Whereby a thickened jam was produced. This thickened jam was found to be useful in ice cream for marbling effects, and it retained the natural raspberry color and flavor.

2. As a base for an icing, glazing, frosting or enrobing material. Thus an enrobing mix was prepared by mixing 10 lbs. of the paste product with 3 lbs. of caramel confection syrup having a milk solids content.

3. As a base material for various confections. Thus a plastic fudge confection was made by adding ½ lb. of cocoa and 1½ lbs. chocolate liquor to 10 lbs. of the paste mix. The plastic fudge was useful in bakery products, confections and ice cream or frozen deserts.

With respect to the formulations referred to above, it was confirmed that honey or sorbitol could be substituted for other sugars or syrup added to the paste product.

EXAMPLE 4

The procedure was the same as described in Example 3. However, after the addition of the fat the mass was concentrated by evaporation in a separate "Sigma"-type steam heated, horizontal, double arm stainless steel mixer to a density of about 95 Brix. Then sufficient granulated sugar and dry corn sugar, in equal parts, was mixed into the hot batch with continued heating to keep the mass fluid to increase the density to about 96 to 98 Brix. This hot viscous mix was then deposited into a compression extruder device, which produced a continuous extrusion having an oval cross-section about 2 inches thick (minor dimension). Thereafter the extruded material was sheeted to a thickness of about one-fourth inch. The sheet was permitted to cool whereby it became brittle. It was fed through breaking rolls whereby it was subdivided into particles or fragments of a size such that they would pass through a ⅜ inch screen. A portion of the coconut fat removed as outlined in Example 1 was sprayed upon the surfaces of the particles to promote free-flowing characteristics. The resulting confection-like product comprised fragments which incorporated tenderized coconut. It was found suitable as a component of various bakery products. Particularly the fragments retained their physical configuration, and when incorporated in baking products they could be readily sliced without color smearing.

EXAMPLE 5

The procedure was the same as in Example 4. However, all of the sugar introduced to increase the density of the syrup was corn sugar. After fracturing the brittle sheet to produce fragments as in Example 4, the fragments were softened by heating and subjected to a partial vacuum whereby they expanded to about twice their normal volume. Also during vacuum treatment the particles were dehydrated below about 2 percent moisture. Such expanded particles were usable in various bakery products and in confections (e.g., like chocolate clusters). Without further processing, they had good eating characteristics.

EXAMPLE 6

The procedure is carried out the same as in Example 3 up to the point of introducing the moist pressed cake into the sugar syrup containing kettle. Instead of having the syrup at boiling temperature, it is at a temperature of about 180°F. After introducing the moist press cake, a partial vacuum is applied with added heat to the point of causing the syrup to boil. Such boiling can be continued for a period of about 40 minutes. The vacuum can then be removed and coconut fat (e.g., 22 lbs.) introduced into the mix, as in Example 3. The material can then be further cooled to form a material like that produced in Example 3 but with noticeably whiter retained color of the particles. Such material has a consistency comparable to almond paste.

EXAMPLE 7

Six lbs. of fresh peeled coconut meat was diced to form particles measuring about ⅜ inch thick. This was introduced into 12 lbs. of boiling water, and boiling continued for a period of 15 minutes. The batch was then discharged on a screen to remove the excess hot liquid. The removed liquid was centrifuged for the removal of 6 ozs. of coconut fat, which alkali washed to remove soluble protein. It was observed that the other water fraction of the removed liquid contained dissolved protein and other solubles. The remaining fresh 7 lbs. of moist coconut meat was introduced into an equal weight of water containing 3 ounces of dissolved fresh bakers yeast. The batch was then held at 98°F. in a proof room for a period of 5 days. It was observed that hardness of the cores of the pieces could be controlled by controlling the length of the fermenting period. In other words, an extra day of fermentation served to produce softer cores, whereas the cores tended to be firmed for a period of less than 5 days. The batch was then discharged on a screen for the removal of the yeast liquor, after which the moist particles were rinsed with warm water (80° to 120°F.) to remove residual fat and soluble protein present. The moist coconut dices were then introduced into 6 lbs. of water in which 20 grams of sodium carbonate had been dissolved. The material was held in this alkali solution for 3 hours, after which the batch was discharged on a screen to remove liquid. Thereafter the coconut dices were rinsed with fresh water and then introduced into 6 lbs. of water containing hydrochloric acid (1 percent solution). The dices were permitted to soak in this acid solution for 4 hours, after which the batch was again discharged on a screen to remove excess free liquid. Some residual hydrochloric acid solution was removed by rinsing with fresh water. The resulting moist dices weighed about 6½ lbs. and were relatively free of yeast odors and flavor. The coconut dices were then introduced into 12 lbs. of boiling sugar syrup at 80 Brix substantially as in example 1. By applying heat, boiling recommenced in about 5 minutes and continued for a further 5 minutes. Excess syrup was then removed from the dices, and while the dices were hot they were rinsed with boiling water to remove free surface syrup. The dices were then dried in a kiln tray dryer commencing at 180°F. and finishing 48 hours later at 160°F. The final moisture content was about 2 percent. The resulting product was nut-like in consistency with a sugar impregnated surface area of dense structure and with good crunchy eating characteristics.

EXAMPLE 8

Washed fat recovered in Example 1 from the liquid removed in step 10 was blended with an equal amount of vanilla-flavored commercial cocoa fat. While the dry particles produced in Example 5 were warm (e.g., about 90°–100°F.) they were coated with the fat blend to provide a congealed surface coating which added to the flavor of the coconut pieces.

EXAMPLE 9

The procedure was the same as in Example 1. The resulting moist product was milled with water to form a slurry which was the spray dried to form a dry discrete material.

EXAMPLE 10

The procedure was similar to that described in Example 3, except the objective was to produce a thickened fruit containing spread. (e.g., "Spread" as defined in F.D.A. Specifications). I commenced with orange marmalade, a pure jam, containing fruit solids. This was concentrated by evaporation with added sugar to produce a density of 68 Brix. To 30 lbs. of this hot jam I stirred in 6 lbs. of the coconut presscake produced as described in Example 2, with some immediate thickening of the jam. After standing overnight it was evident that the coconut had significantly thickened the product. The moisture added by way of the coconut reduced the density of the product to spread status of 58 Brix, but the spread was thicker or more viscous than the jam at the higher density. When used in baked products as a filling, it spread less during baking than the same jam without the coconut. The coconut disrupted the gel properties so that with or without a little added milk solids, for example, and eaten as a refrigerated desert it had pleasant spoonable eating properties.

EXAMPLE 11

The procedure and formulation was the same as described in Example 10, except that the jam and coconut presscake were placed in a scraper agitated steam kettle, and with applied heat and agitation the product was concentrated to 68 Brix. The batch was then removed and allowed to cool and set up overnight. It was observed that the flavor, appearance and color of the jam dominated the product and that it was significantly thicker or more viscous than the starting jam. When used as a filling in baked products it remained in place and did not dilute or run with the baking heat. The balance of the mix I continued to concentrate in the steam kettle to a density of 80. This was then cooled and allowed to set up overnight. It was observed that the material had further thickened. Thickening of such paste-jam mixtures was attributed to moisture redistribution in the mix due to the absorbent character of the coconut content. Such thickened jams and like products are useful in baking and other products. With sufficient body at ambient room temperature, masses of such products may be enrobed with chocolate and the like.

EXAMPLE 12

The procedure and formula were the same as described in Example 10 except that 1 percent gum tragacanth of the jam weight was added to the steam kettle. As described in Example 10, the material was concentrated to 85 Brix. The resulting material was extruded and divided into ¼ oz. particles that were deposited on a starch bed. After allowing the pieces to cool and set overnight, the free starch was separated from the particles. It was observed that at ambient temperature the bulk mass of particles were free flowing, which was attributed to the setting or gelling action of the gum present, together with the thickening properties of the coconut. These particles were tender to eat out of hand. However, when mixed with dough and baked (e.g., as cookies) on Teflon coated pans, the coconut preserved the particle identity during the baking cycle and retarded lateral flow in the oven. When the cookies cooled they could be easily separated from the Teflon pan even in those instances where the jam was in direct pan contact. Besides the known properties of Teflon I attributed the ease of separation in part to the stabilizing properties of the coconut which tended to prevent the syrup from separating or spreading in baking, or to liquify and run down on the hot pan. Separate baking tests using such particles with coffee cake, yeast and chemical leavened doughs, yielded similar results.

Gelling agents other than gum tragacath, such as gum arabic, algins, starches, carboxymethyl cellulose (C.M.C.), gelatin and pectin may be employed to stabilize the moisture in the sugar under ambient conditions and to provide free flowing properties.

EXAMPLE 13

In the following example, cheese is used to produce a cheese-like final product. A moist tenderized coconut presscake was prepared as in Example 2. This presscake was then added to other ingredients according to the following formula:

|  | lbs. |
|---|---|
| Presscake | 100 |
| Corn Sugar (15 D.E.) | 250 |
| Granulated Sugar | 60 |
| Spray Dried Chedder Cheese | 75 |
| Water | 165 |
| Salt | 10 |
| Coconut Fat | 75 |
| Glycerin | 25 |

The moist presscake, sugar, corn sugar and water were introduced into a steam kettle provided with an agitator and heated to boiling temperature maintained for a sufficient period of time to concentrate the syrup to 77 Brix. To this material was added the spray dried cheese, salt, coconut fat and glycerine to provide a mass of 82 Brix which was then cooled to provide a plastic paste. This product was then used as a filler with a cooky dough, and it was noted that it had the same desirable properties as the fruit fillings of Example 10. Particularly, it did not spread during baking, exposed surfaces of the filling did not burn, and the main body of the filling did not darken in color. In storage the product remained plastic without loss of moisture. The baked product had good keeping properties and the moisture from the filling did not migrate into the baked dough.

EXAMPLE 14

The following is an example in which a product is prepared containing substantial amounts of tomato.

A moist tenderized presscake was prepared as in Example 2. This moist material was dried to 1 percent moisture and then comminuted to a dry powder of −12 mesh. This dry powder was then added to other ingredients according to the following formula:

|  | lbs. |
|---|---|
| Tomato Puree (25% solids) | 24 |
| Corn Sugar (15 D.E.) | 16 |
| Glycerine | 8 |
| Comminuted and dried Coconut (66⅔% solids) | 3 |

The above ingredients after mixing were introduced into a steam jacketed double-arm vacuum concentrator provided with high speed agitating means. Initially it was heated to near boiling point and concentrated to 75 Brix at atmospheric pressure. Then a partial vacuum was applied with further evaporation and cooling of the mix. The total time of treatment in the concentrator was about 20 minutes. It was observed that the coconut particles in the final product were rehydrated and penetrated with the other ingredients. The product obtained was a smooth paste of tomato flavor and color. It was verified that this paste could be used to advantage as a filling for jacketed type baked doughs, and that the jam did not discolor when exposed to over temperatures. During storage moisture remained in the filling without undue migration into the dough. The resulting baked products could be stored at atmospheric temperature without material change in properties. It was also verified that this tomato-flavored filling could be used as a filling in connection with unbaked dough stored at refrigeration temperatures. Here again it possessed good storage properties without causing any deterioration of the dough over periods of several weeks. When baked, such a refrigerated product had the same desirable properties as described above.

The procedure described in the foregoing Example 14 can also be used to produce a cheese-flavored product as in Example 13, provided sufficient water is supplied in the formulation.

In the flow diagram of the drawing, comminuting is indicated in step 28 following the syrup impregnating step 25. However, as indicated in the preceding description and examples, the comminuting step, if carried out, may precede step 28, but preferably follows deodorizing. Assuming use of the neutralizing step 21 and pressing 23, comminuting can be applied to the moist presscake whereby product A is a hydrous paste suitable for drying or for introduction into other products (e.g., jams, etc.) Also it is desirable to avoid disintegration of the coconut in steps preceding and including step 23, because it is difficult to carry out such steps on finely divided coconut meat solids as distinguished from hydrated coconut meat particles like shreds, strings or dices.

EXAMPLE 15

In the following example, precooked chicken particles are used with a tenderized coconut presscake to prepare a product containing substantial amounts of chicken.

Diced prebaked chicken pieces (1 lbs.) are mixed with Corn Syrup (15 D.E.) at 70 Brix density. Thereafter, water was added to lower the Brix density to a value of 30. The mixture was then heated to boil the chicken particles in the syrup. Only moderate external agitation was used since boiling in the excess thin hot syrup created substantial mixing. After an hour of simmering, at an 80 Brix syrup density, the chicken particles were removed from the syrup. The Brix density of the chicken particles was on the order of 75 Brix sugar density. This, coupled with a drained weight of 20 oz., demonstrated good sugar penetration and desired ambient stability. To the drained corn syrup was added 25 percent of its weight of tenderized coconut presscake with a solids content of 66⅔ percent prepared as in Example 2. Water was then added to this mixture until the Brix density was reduced to 50. Thereafter, the mixture was concentrated in an agitated steam heater kettle to form a paste with a Brix density of 85. This paste was then blended with the sugar-treated chicken in a ratio of 1:1.5 to form a final product with a density of 78 Brix.

The final product retained its form, without spreading or burning, at over atmosphere or pan temperature during baking. When properly packaged, it remained stable at ambient conditions for several months in the form of chicken particles dispersed in a macaroon-like chicken flavored filling. The chicken was tender and contributed a pleasant taste to the baked product.

The procedure described in the foregoing Example 15 can also be used to produce a similar product containing particles of meat, fish (e.g., shrimp) or other fowl to form a product of the desired distinctive type.

I claim:

1. In a process for the treatment of coconut meat, the step of subjecting hydrated coconut meat in particulate form to fermentation in the presence of bakers yeast as a fermenting medium to tenderize the meat.

2. A process as in claim 1 in which the coconut meat is subjected to pretreatment before fermentation in which some fat is removed from the meat.

3. A process as in claim 2 in which the pretreatment involves immersion of the coconut in hot water.

4. A process as in claim 1 in which undesirable odors and flavor are reduced by contact of the meat with an alkali solution after fermentation.

5. In a process for the treatment of coconut meat, the steps of subjecting the meat to pretreatment in hot water at a temperature of the order of 100° to 220°F. to provide a moist meat from which some of the fat content has been removed, subjecting the resulting moist coconut meat to a fermenting operation carried out with the meat in water containing bakers yeast as a fermenting medium, continuing fermentation until the coconut meat has been tenderized to a substantial degree, and then removing the resulting moist coconut meat from the liquor.

6. A process as in claim 5 in which after said pretreatment free liquid and fat are removed from the meat.

7. A process as in claim 5 in which the moist coconut meat obtained after fermentation is contacted with an alkali solution to deodorize the same.

8. A process as in claim 7 in which the coconut meat after being contacted with an alkali solution is contacted with an acid solution to effect neutralization of the alkali.

9. A process as in claim 1, in which the moist coconut meat is dried to form a dry product.

10. In a process for the treatment of coconut meat, the steps of immersing the meat in particulate and hydrated form in water containing bakers yeast as a fermenting medium, permitting the batch to ferment for a period of time sufficient to tenderize the particles, separating the resulting liquid fraction from the moist tenderized coconut particles, and then treating the moist particles to eliminate some undesirable odor and flavor resulting from fermentation.

* * * * *